United States Patent
Maeda et al.

(12) 
(10) Patent No.: US 6,263,497 B1
(45) Date of Patent: Jul. 17, 2001

(54) REMOTE MAINTENANCE METHOD AND REMOTE MAINTENANCE APPARATUS

(75) Inventors: Tetsuji Maeda, Nara; Toshiya Mori, Settsu, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/123,111

(22) Filed: Jul. 27, 1998

(30) Foreign Application Priority Data

Jul. 31, 1997 (JP) .................................................. 9-206735

(51) Int. Cl.[7] .................................................. G06F 9/445
(52) U.S. Cl. .................. 717/11; 717/1; 707/203; 707/511
(58) Field of Search .................. 717/11, 1; 707/203, 707/511

(56) References Cited

U.S. PATENT DOCUMENTS

| | | |
|---|---|---|
| 5,008,814 | 4/1991 | Mathur . |
| 5,815,722 | * 9/1998 | Kalwitz et al. ........................ 717/11 |
| 5,974,454 | * 10/1999 | Apfel et al. .......................... 709/221 |
| 5,999,740 | * 12/1999 | Rowley .................................. 717/11 |
| 5,999,741 | * 12/1999 | May et al. ............................. 717/11 |
| 6,006,034 | * 12/1999 | Heath et al. ........................... 717/11 |
| 6,009,274 | * 12/1999 | Fletcher et al. ....................... 717/11 |
| 6,041,183 | * 3/2000 | Hayafune et al. ..................... 717/11 |
| 6,047,129 | * 4/2000 | Frye ...................................... 717/11 |
| 6,074,434 | * 6/2000 | Cole et al. ............................. 717/11 |
| 6,094,531 | * 7/2000 | Allison et al. ......................... 717/11 |

OTHER PUBLICATIONS

Salamone, Salvatore, *Electronic Software Distribution: Diamond in the Rough*, Data Communications, vol. 22, No. 4, Mar. 1, 1993, pp. 109–110, 112, 114, 116.

Futagami et al., "A realtime Telecommunication Platform Geared to Advanced Online Maintenance", IEEE, pp. 577–581, Dec. 1994.*

Symborski, "Updating Software And Configuration Data In A Distributed Communications Network", IEEE, pp. 331–338, Apr. 1988.*

Higaki et al., "Group Communication Approach for Flexible Distributed Systems", IEEE, pp. 154–160, Jun. 1996.*

* cited by examiner

Primary Examiner—Kakali Chaki
Assistant Examiner—Ted T. Vo
(74) Attorney, Agent, or Firm—Burr & Brown

(57) ABSTRACT

The transmitter transmits program information including machine type codes showing the version of hardware able to receive program data, version information indicating the version of software corresponding to the machine type code, and the names and codes of programs to replace with or be added to for the version of software. The receiver compares a machine type code indicating the version of the receiver hardware and version information showing the version of software corresponding to the machine type code with the machine type codes and version information of the program information, examines whether the version of software is updated or not, and, when the version is not updated, stores program codes to update the version. Thereby, it is possible to provide a remote maintenance method and a remote maintenance apparatus able to update the version of software, securing the matching of software and hardware, in a network of wired or wireless broadcasting.

14 Claims, 13 Drawing Sheets

Fig.4 machine type code   STB-9706
version information   000001
   program name   (OS kernel)
      program data PID   0x0101
   program name   (graphics library)
      program data PID   0x0111
   program name   (test program)
      program data PID   0x0121
version information   010001
   program name   (MPEG driver)
      program data PID   0x0201
   program name   (test program)
      program data PID   0x0211
machine type code   STB-9710
version information   010100
   program name   (AV library)
      program data PID   0x1001
   program name   (AV driver)
      program data PID   0x1011
   program name   (test program)
      program data PID   0x1021
                ⋮

Fig.9 all-service information
   game
   news
   ⋮
   weather forecast
machine type code    STB-9706
   version information    000001
      game
      news
   version information    010001
      game
      news
      karaoke
machine type code    STB-9710
   version information    010100
      game
      news
      karaoke
      stock quotations
      sports news
machine type code    STB-9810
   ⋮

Fig.11

| service | mark |
|---|---|
| game | × |
| news | ○ |
| karaoke | ○ |
| stock quotations | × |
| sports news | ○ |
| ……. | × |
| ……. | × |
| ……. | × |
| ……. | × |
| weather forecast | ○ |

Fig.14

```
all-service information
    game
        full-color display
            ⋮
    news
        bilingual
        stereo
            ⋮
    karaoke
        stereo
            ⋮
    machine type code     STB-9706
        version information    000001
            game
                16-color display
                    ⋮
            news
                stereo
                    ⋮
        version information    010001
            game
                256-color display
                    ⋮
            news
                bilingual
                stereo
                    ⋮
```

REMOTE MAINTENANCE METHOD AND REMOTE MAINTENANCE APPARATUS

FIELD OF THE INVENTION

The present invention relates to a method and an apparatus for, by remote maintenance, updating the version of software in remote equipment connected to wired or wireless broadcasting networks, or replacing or adding the software.

BACKGROUND OF THE INVENTION

Conventionally, in a network using a wired or wireless, digital broadcasting system, digital data transmitted via the network is received and processed by an apparatus with software suitable for the exclusive hardware of the apparatus.

An example of such a conventional network is a broadcasting system using broadcasting satellites. In the system, all broadcasting stations produce and transmit programs with the same broadcasting format (video transmission format, video coding format, etc.), such as MPEG. The receiver receives and presents the programs with the exclusive hardware of a receiving apparatus handling the same broadcasting format.

An improvement in performance of computers achieves video signal processing, which only exclusive hardware has ever performed, by using software exploiting all-purpose hardware. Therefore, a receiving apparatus having no exclusive hardware can decode plural broadcast data of different formats, if all-purpose hardware of the receiving apparatus is loaded with software programs which decode the respective broadcast data. This makes possible broadcasting in which plural formats are mixed, such as data broadcasting different from conventional video/audio broadcasting.

Consequently, it is predictable that there will be much demand for a system in which programs executed in a receiving apparatus are downloaded via wired or wireless digital broadcasting.

However, a software program must be able to be handled by terminal hardware receiving the software program. In other words, if an inappropriate program is input to a terminal, the terminal no longer works. For this reason, to produce a software program suitable for terminal hardware, it is required to know complete information about the details of the terminal hardware. Terminals in the market have various kinds of specifications. Hence, it is difficult to transmit the software programs suitable for all the respective terminal hardware, because the amount of transmission is large.

An idea is conceived that a software program is divided into module programs, the module programs are transmitted, and each terminal stores only some of the module programs that the terminal hardware can execute. According to this idea, it is possible to update the version of a software program by replacing part of the software program with, or adding, other programs, without storing the whole software program. Therefore, in updating a version, it is, of course, necessary to know information about terminal hardware. Besides, information about the version of software currently stored in the terminal is required.

As described above, to secure the update of the version of software in a terminal due to programs being downloaded by remote maintenance, it is important to match software stored in a terminal to the terminal hardware.

SUMMARY OF THE INVENTION

An object of this invention is to provide a remote maintenance method and a remote maintenance apparatus for updating the version of software while matching the version of software to that of hardware, via a wired or wireless network capable of transmitting digital data.

Other objects and advantages of the present invention will become apparent from the detailed description desired hereinafter; it should be understood, however, that the detailed description and specific embodiment are desired by way of illustration only, since various changes and modifications within the scope of the invention will become apparent to those skilled in the art from this detailed description.

According to a first aspect of this invention, there is provided a remote maintenance method in which the transmitter transmits a program which is a collection of functions performing the respective tasks, via wired or wireless digital broadcasting, and the receiver updates the version of software comprising a group of the programs by changing the programs or adding other programs to the programs, the transmitter transmitting, by data packet, download information including machine type codes indicating the version of hardware able to receive the program data, version information indicating the version of software corresponding to the machine type code, program names being the names of the programs to replace with or be added to for the version of software, and the identifiers of program data packets (PID) including program codes necessary for updating the version of software corresponding to the machine type code, and program data including the program codes of the program, the program name, and the identifier of the packet (PID), and the receiver comparing a machine type code indicating the version of the receiver hardware, and version information indicating the version of software corresponding to the machine type code, with the machine type codes and version information described in the received download information, and, when the versions of software do not match each other and thus the version of software is not updated, updating the version by receiving and storing the data packet including program data necessary for updating the version, based on the PID described in the download information.

Thereby, a remote maintenance method can update the version of software, securing the matching of software and hardware in the receiver executing received programs.

According to a second aspect of this invention, there is provided the remote maintenance method of the first aspect wherein the program data further includes allocation information about where functions included in the program are to be located at the receiver, and, the receiver replaces transmitted programs with, or adds the transmitted programs to, the programs stored at the receiver, based on the allocation information.

Thereby, a software program can be certainly executable by updating the version.

According to a third aspect of this invention, there is provided the remote maintenance method of the first aspect wherein in updating the version, the receiver checks whether a transmission error occurs or not, and informs the transmitter of a result of the check.

Thereby, the transmitter, when there are transmission errors, can instruct the receiver how to appropriately handle the errors, and, when there are no errors, can know that programs are certainly downloaded.

According to a fourth aspect of this invention, there is provided the remote maintenance method of the first aspect wherein the transmitter transmits program data including the program codes of test programs, and the receiver, in updating the version, executes the test program, and informs the transmitter whether an execution error occurs or not.

Thereby, the transmitter, when there are execution errors, can instruct the receiver how to appropriately handle the errors, and, when there are no errors, can know that programs are executable when the version is updated.

According to a fifth aspect of this invention, there is provided a remote maintenance method in which the transmitter transmits a program which is a collection of functions performing the respective tasks, via wired or wireless digital broadcasting, and the receiver updates the version of software comprising a group of the programs by changing the programs or adding other programs to the programs, the transmitter transmitting, by data packet, download information including machine type codes indicating the version of hardware able to receive program data, version information indicating the version of software corresponding to the machine type code, program names being the names of the programs to replace with or be added to for the version of software, and the identifiers of program data packets (PID) including program codes necessary for updating the version of software corresponding to the machine type code, and the receiver comparing a machine type code indicating the version of the receiver hardware and version information indicating the version of software corresponding to the machine type code, with the machine type codes and version information described in the received download information, checking whether the version of software is updated or not, and informing the transmitter of a result of the check.

Thereby, the transmitter can confirm which remote maintenance apparatus has not had the version of software updated, can update the version of software in the remote maintenance apparatus by transmitting program codes, and can know that the program codes are transmitted and the version is completely updated.

According to a sixth aspect of this invention, there is provided a remote maintenance method in which the transmitter transmits a program which is a collection of functions performing the respective tasks, via wired or wireless digital broadcasting, and the receiver updates the version of software comprising a group of the programs by changing the programs or adding other programs to the programs, the transmitter transmitting service program information including all-service information indicating all the names of services provided by the transmitter, machine type codes indicating the version of hardware able to receive the program data, version information indicating the version of software corresponding to the machine type code, and the names of services executable with each version of software, and the receiver comparing a machine type code indicating the version of the receiver hardware and version information indicating the version of software corresponding to the machine type code, with machine type codes and version information of the service program information, and marking the services in the all-service information, executable with the current version of software, or, when the compared versions do not match each other and thus the version of software is not updated, executable if the version of software is updated.

Thereby, the viewer can know what services are executable with the current version of software, or what services will be executable if the version is updated.

According to a seventh aspect of this invention, there is provided a remote maintenance method in which the transmitter transmits a program which is a collection of functions performing the respective tasks, via wired or wireless digital broadcasting, and the receiver updates the version of software comprising a group of the programs by changing the programs or adding other programs to the programs, the transmitter transmitting service program information including all-service information indicating all the names of services provided by the transmitter and service execution restricting items indicating the level of hardware/software performance demanded by each service, machine type codes indicating the version of hardware able to receive the program data, version information indicating the version of software corresponding to the machine type code, the names of services executable with each version of software, and service execution restricting items indicating the levels of hardware/software performance for the services executable with each version of software, and the receiver comparing a machine type code indicating the version of the receiver hardware and version information indicating the version of software corresponding to the machine type code, with machine type codes and version information of the service program information, and storing, among the service program information, the all-service information and information about the services executable with the current version of software, or, when the compared versions do not match each other and thus the version of software is not updated, executable if the version of software is updated.

Thereby, the viewer can know what services are executable with the current version of software, or what services will be executable if the version is updated, and the viewer can know on what levels of hardware/software performance executable services can be executed.

According to an eighth aspect of this invention, there is provided a remote maintenance apparatus executing a remote maintenance method in which the transmitter transmits a program which is a collection of functions performing the respective tasks, via wired or wireless digital broadcasting, and the receiver updates the version of software comprising a group of the programs by changing the programs or adding other programs to the programs, the apparatus comprising:

a program receiving unit for receiving download information, transmitted from the transmitter, including machine type codes indicating the version of hardware able to receive the program, version information indicating the version of software corresponding to the machine type code, program names being the names of the programs to replace with or be added to for the version of software, and the identifiers of program data packets (PID) including program codes necessary for updating the version of software corresponding to the machine type code, and program data including the program codes of the program, the program name, and the identifier of the packet;

a hardware information storing unit for storing a machine type code indicating the version of the apparatus hardware;

a software information storing unit for storing version information indicating the current version of software in the apparatus;

a loader for comparing the machine type code stored in the hardware information storing unit and the version information stored in the software information storing unit, with the machine type codes and version information of the download information to check whether the version of software is updated or not, and, when the compared versions do not match each other and thus the version of software is not updated, storing the program codes of the program necessary for updating the version of software in a program storing unit described hereinafter, based on the PID described in the download information;

a program storing unit for storing the program codes necessary for updating the version of software out of the program data; and a program executing unit for executing the program stored in the program storing unit.

Thereby, a remote maintenance method can update the version of software, securing the matching of software and hardware in the receiver executing received programs.

According to a ninth aspect of this invention, there is provided a remote maintenance apparatus executing a remote maintenance method in which the transmitter transmits a program which is a collection of functions performing the respective tasks, via wired or wireless digital broadcasting, and the receiver updates the version of software comprising a group of the programs by changing the programs or adding other programs to the programs, the apparatus comprising:

a program receiving unit for receiving download information, transmitted from the transmitter, including machine type codes indicating the version of hardware able to receive the program, version information indicating the version of software corresponding to the machine type code, program names being the names of the programs to replace with or be added to for the version of software, and the identifiers of program data packets (PID) including program codes necessary for updating the version of software corresponding to the machine type code, and program data, transmitted from the transmitter, including the program codes of the program, the program name, the identifier of the packet, and allocation information about where functions included in the program are located at the receiver;

a hardware information storing unit for storing a machine type code indicating the version of the apparatus hardware;

a software information storing unit for storing version information indicating the current version of software in the apparatus;

a loader for comparing the machine type code stored in the hardware information storing unit and the version information stored in the software information storing unit, with the machine type codes and version information of the download information to check whether the version of software is updated or not, and, when the compared versions do not match each other and thus the version of software is not updated, storing the program codes of the program necessary for updating the version of software in a program storing unit described hereinafter, based on the PID and allocation information described in the download information;

a program storing unit for storing the program codes necessary for updating the version of software out of the program data; and a program executing unit for executing the program stored in the program storing unit.

Thereby, a software program can be certainly executable by updating the version.

According to a tenth aspect of this invention, there is provided the remote maintenance apparatus of the ninth aspect wherein in updating the version, the loader checks whether a transmission error occurs or not, and informs the transmitter, via a communications unit described hereinafter, of a result of the check, and the apparatus further comprises the communications unit for informing the transmitter of a result of the check.

Thereby, the transmitter, when there are transmission errors, can instruct the receiver how to appropriately handle the errors, and, when there are no errors, can know that programs are certainly downloaded.

According to an eleventh aspect of this invention, there is provided the remote maintenance apparatus of the ninth aspect wherein the program receiving unit receives program data including the program codes of test programs, transmitted from the transmitter;

the loader, in controlling the storage of the program, informs the transmitter, via a communications unit described hereinafter, whether an execution error occurs or not in the execution of the test programs by the program executing unit; and the apparatus further comprises the communications unit for informing the transmitter whether an execution error occurs or not in the execution of the test programs by the program executing unit.

Thereby, the transmitter, when there are execution errors, can instruct the receiver how to appropriately handle the errors, and, when there are no errors, can know that programs are executable when the version is updated.

According to a twelfth aspect of this invention, there is provided a remote maintenance apparatus executing a remote maintenance method in which the transmitter transmits a program which is a collection of functions performing the respective tasks, via wired or wireless digital broadcasting, and the receiver updates the version of software comprising a group of the programs by changing the programs or adding other programs to the programs, the apparatus comprising:

a program receiving unit for receiving download information, transmitted from the transmitter, including machine type codes indicating the version of hardware able to receive the program, version information indicating the version of software corresponding to the machine type code, program names being the names of the programs to replace with or be added to for the version of software, and the identifiers of program data packets (PID) including program codes necessary for updating the version of software corresponding to the machine type code;

a hardware information storing unit for storing a machine type code indicating the version of the apparatus hardware;

a software information storing unit for storing version information indicating the current version of software in the apparatus;

a loader for comparing the machine type code stored in the hardware information storing unit and the version information stored in the software information storing unit, with the machine type codes and version information of the download information to check whether the version of software is updated or not, and informing the transmitter of a result of the check via a communications unit described hereinafter;

a communications unit for when it is checked whether the version of software is updated or not, informing the transmitter of a result of the check along with the machine type code and version information of the apparatus;

a program storing unit for storing the program; and a program executing unit for executing the program stored in the program storing unit.

Thereby, the transmitter can confirm which remote maintenance apparatus has not had the version of software updated, can update the version of software in the remote maintenance apparatus by transmitting program codes, and can know that the program codes are transmitted and the version is completely updated.

According to a thirteenth aspect of this invention, there is provided a remote maintenance apparatus executing a remote maintenance method in which the transmitter transmits a program which is a collection of functions performing the respective tasks, via wired or wireless digital broadcasting, and the receiver updates the version of software comprising a group of the programs by changing the programs or adding other programs to the programs, the apparatus comprising:

a program receiving unit for receiving service program information, transmitted from the transmitter, including all-service information indicating all the names of services provided by the transmitter, machine type codes indicating the version of hardware able to receive the program data, version information indicating the version of software corresponding to the machine type code, and the names of services executable with each version of software;

a hardware information storing unit for storing a machine type code indicating the version of the apparatus hardware;

a software information storing unit for storing version information indicating the current version of software in the apparatus;

a loader for comparing the machine type code indicating the version of the receiver hardware and the version information indicating the version of software corresponding to the machine type code, with the machine type codes and version information of the service program information, marking the services, executable with the current version of software or, when the compared versions do not match each other and thus the version of software is not updated, executable if the version of software in the receiver is updated, and storing the marked all-service information in a service information storing unit described hereinafter;

a service information storing unit for storing the marked all-service information;

a program storing unit for storing the program;

a program executing unit for executing the program stored in the program storing unit, and creating a display image based on the information stored in the service information storing unit; and a presentation unit for presenting the display image created by the program executing unit.

Thereby, the viewer can know what services are executable with current the version of software, or what services will be executable if the version is updated.

According to a fourteenth aspect of this invention, there is provided a remote maintenance apparatus executing a remote maintenance method in which the transmitter transmits a program which is a collection of functions performing the respective tasks, via wired or wireless digital broadcasting, and the receiver updates the version of software comprising a group of the programs by changing the programs or adding other programs to the programs, the apparatus comprising:

a program receiving unit for receiving service program information, transmitted from the transmitter, including all-service information indicating all the names of services provided by the transmitter and service execution restricting items indicating the level of hardware/software performance demanded by each service, machine type codes indicating the version of hardware able to receive the program data, version information indicating the version of software corresponding to the machine type code, the names of services executable with each version of software, and service execution restricting items indicating the levels of hardware/software performance for the services executable with each version of software;

a hardware information storing unit for storing a machine type code indicating the version of the apparatus hardware;

a software information storing unit for storing version information indicating the current version of software in the apparatus;

a loader for comparing the machine type code indicating the version of the receiver hardware and the version information indicating the version of software corresponding to the machine type code, with machine type codes and version information of the service program information, and storing, among the service program information, the all-service information and information about the services, executable with the current version of software or, when the compared versions do not match each other and thus the version of software is not updated, executable if the version of software is updated, in a service information storing unit described hereinafter;

a service information storing unit for storing the all-service information and information about the services, executable with the current version of software or, when the version of software is not updated, executable if the version of software is updated.

a program executing unit for executing the program stored in the program storing unit, and creating a display or audio image based on the information stored in the service information storing unit; and a presentation unit for presenting the display or audio image created by the program executing unit.

Thereby, the viewer can know what services are executable with the current version of software, or what services will be executable if the version is updated, and the viewer can know on what levels of hardware/software performance executable services can be exec ed.

BRIEF DESCRIPTIONS OF THE DRAWINGS

FIG. 4 is a diagram showing an example of download information to be transmitted from the transmitter, via radio waves of a broadcasting satellite, in the remote maintenance method of the first embodiment.

FIG. 9 is a diagram showing an example of service program information to be transmitted from a broadcasting station, in a remote maintenance method in accordance with a third embodiment.

FIG. 11 shows service program information, in which the executable services in all-service information are marked, stored in a service information storing unit of the remote maintenance apparatus shown in FIG. 1.

FIGS. 13(a) and 13(b) are diagrams showing an example of service program information stored in a service information storing unit, displayed on a screen, in a remote maintenance method in accordance with a fourth embodiment.

FIG. 14 is a diagram showing an example of service program information to be transmitted from a broadcasting station in the remote maintenance method of the fourth embodiment.

DETAILED DESCRIPTION OF THE PREFERRED EMBODIMENTS

Figure 1:
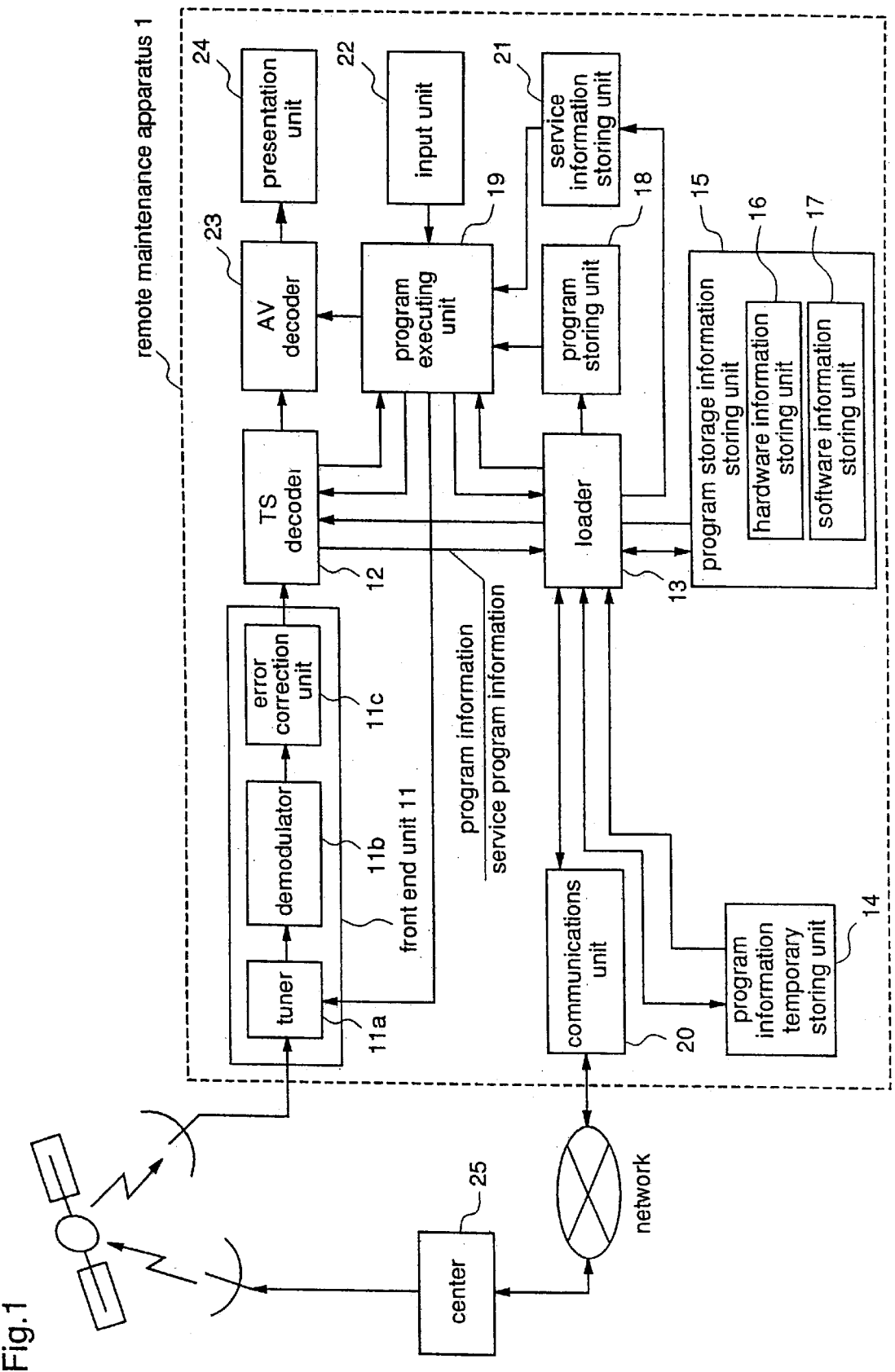
FIG. 1 is a block diagram showing a structure of remote maintenance/apparatus according to first to fourth embodiments combined.

FIG. 1 is a block diagram showing a structure of remote maintenance apparatus according to first to fourth embodiments combined. In the figure, reference numeral 11 indicates a front-end unit, which comprises a tuner, a demodulator, and an error correction unit. 11a is a tuner which synchronizes with the frequency of a physical channel in response to channel selection, and, for example, taking up a signal modulated according to the QPSK (Quadrature Phase Shift Keying) format. 11b is a demodulator for demodulating QPSK signals to a transport stream of the MPEG (Moving Picture Experts Group) format. 11c is an error correction unit for detecting errors in the demodulated stream using hardware. 12 is a TS decoder for decoding the MPEG transport stream taken by the front-end unit 11, and taking up, from a selected channel, data packets respectively including video data, program information, download information, and program data. 13 is a loader which is a controller of storing data packets, storing programs, and storing service program information. 14 is a program information temporary storing unit for temporarily storing the download information and program data decoded. 15 is a program storage information storing unit comprising a hardware information storing unit and a software information storing unit. 16 is the hardware information storing unit for storing the version information of hardware. 17 indicates the software information storing unit for storing version information about the software currently stored. 18 is a program storing unit for storing desired program codes out of the program data stored in the program information temporary storing unit 14. 19 is a program executing unit for executing programs stored in the program storing unit 18. 20 is a communications unit for communicating with the transmitter by connecting a modem to telephone lines and the like. 21 is a service program information storing unit for storing decoded service program information. 22 is an input unit comprising a remote control gadget and a remote control receiver, for receiving infra-red signals output by the remote control gadget controlled by the user, converting an input of the remote control gadget to an input event, and inputting the input event to the program executing unit 19. 23 is an AV decoder for decoding a menu produced by the program executing unit 19, and a video stream and an audio stream of the MPEG format transmitted from the TS decoder 12, converting the video stream to analog signals of the NTSC (National Television System Committee) format or the like, converting the audio stream to analog signals by DAC (Digital Audio Converter), and outputting the same to a presentation unit. 24 is a presentation unit which is a TV monitor for presenting audio/video analog signals output from the AV decoder 23, and displaying the menu produced by the program executing unit 19.

[Embodiment 1]

Figure 2:
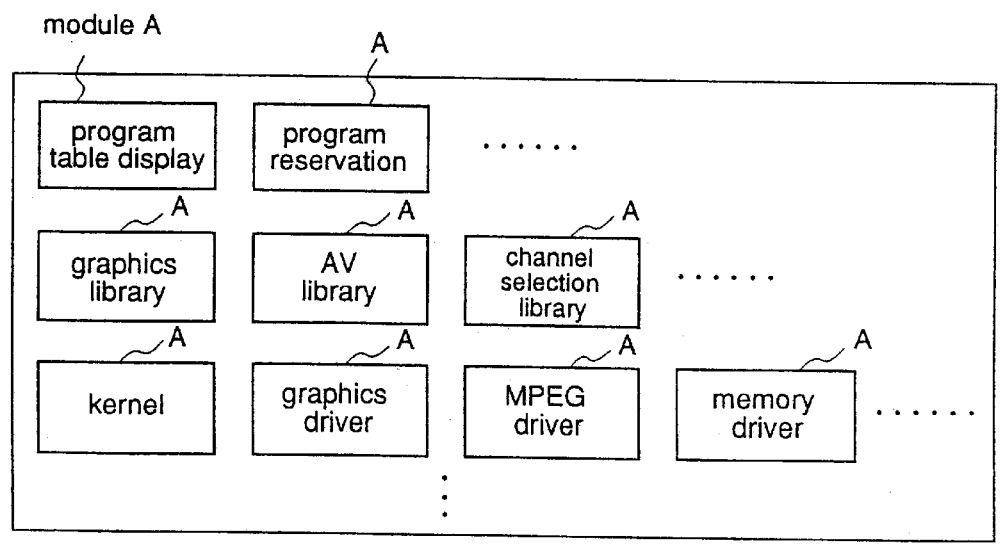
FIG. 2 is a schematic diagram showing a structure of software to be executed by the remote maintenance apparatus of the first embodiment.

FIG. 2 is a diagram showing a structure of software to be executed by a remote maintenance apparatus in accordance with a first embodiment of the present invention.

As shown in the figure, the software comprises units, each unit being called a module A including a collection of functions performing the respective tasks, and having been transmitted by the transmitter. That is, in downloading, only the module A having a new version is transmitted, and the module A is replaced with the old one to update the version of software in the program storing unit 18 (see FIG. 1). In this invention, a module of software is called a program. Each program has its program name, such as MPEG driver, graphics library, or OS kernel.

Figure 3:
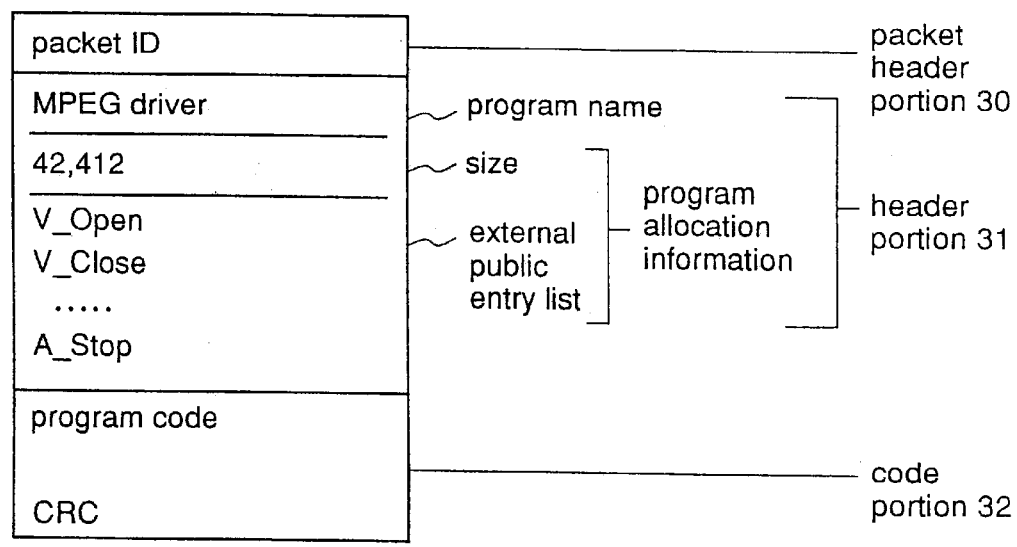
FIG. 3 is a diagram showing an example of program data to be transmitted from the transmitter, via radio waves of a broadcasting satellite, in the remote maintenance method of the first embodiment.

FIG. 3 is a diagram showing an example of program data transmitted by the transmitter using radio waves of a broadcasting satellite in the remote maintenance method according to the first embodiment of this invention.

In the figure, reference numeral 30 denotes a packet header portion where the packet ID of the program data is described. 31 is a header portion where the program name of the program data, and program allocation information about the allocation of the program are described. 32 is a code portion where program codes are stored in a way in which the program codes can be relocated. At the end of the code portion 32, CRC is added for checking transmission errors, such as data incompleteness. The program is described with, for example, relative addressing so that the program can be relocated. The program allocation information in the header portion 31 comprises the size of the program described in the code portion, and a list of the functions and variables of the program open to external programs (the list is hereinafter referred to as "external public entry list"). Hence, to update the version of software, the program codes are replaced with other program codes, or other program codes are added to the program codes, referring to the program name, according to the program allocation information.

FIG. 4 is a diagram showing an example of the download information transmitted by the transmitter using radio waves of a broadcasting satellite in the remote maintenance method according to the first embodiment of this invention.

As shown in the figure, the download information includes hardware information of a receiving apparatus (machine type codes), version information indicating what version the software of the receiving apparatus corresponding to the machine type code will be updated to by downloading programs, program names being the names of the programs to replace with or be added to for the version of software, and the IDs of data packets where program data necessary for updating the version are stored.

Figure 5:
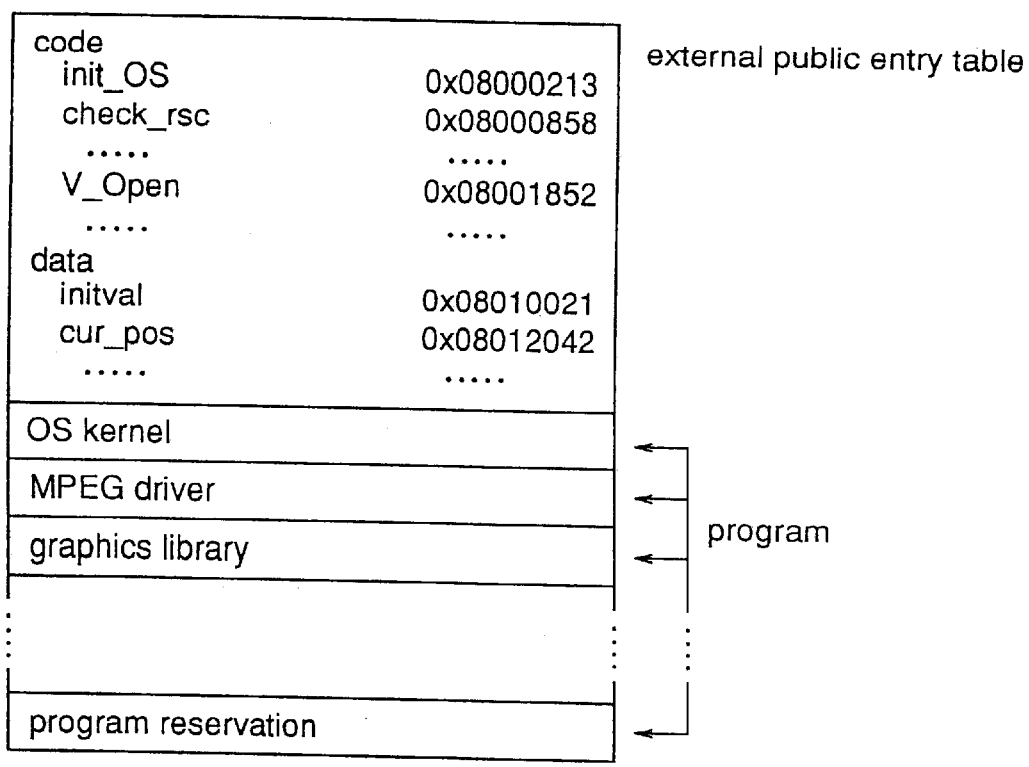
FIG. 5 is a diagram showing an example of the state of a program stored in a program storing unit shown in FIG. 1.

FIG. 5 is a diagram showing an example of the state of a program stored in the program storing unit shown in FIG. 1.

As shown in the figure, to realize indirect addressing to functions and variables (hereinafter referred to as "entries") which each program opens to the external public, an external public entry table, in which the entries and the addresses are combined, is disposed at the lower addresses of the program storing unit. Programs are located at the higher addresses following the external public entry table.

Figure 6:
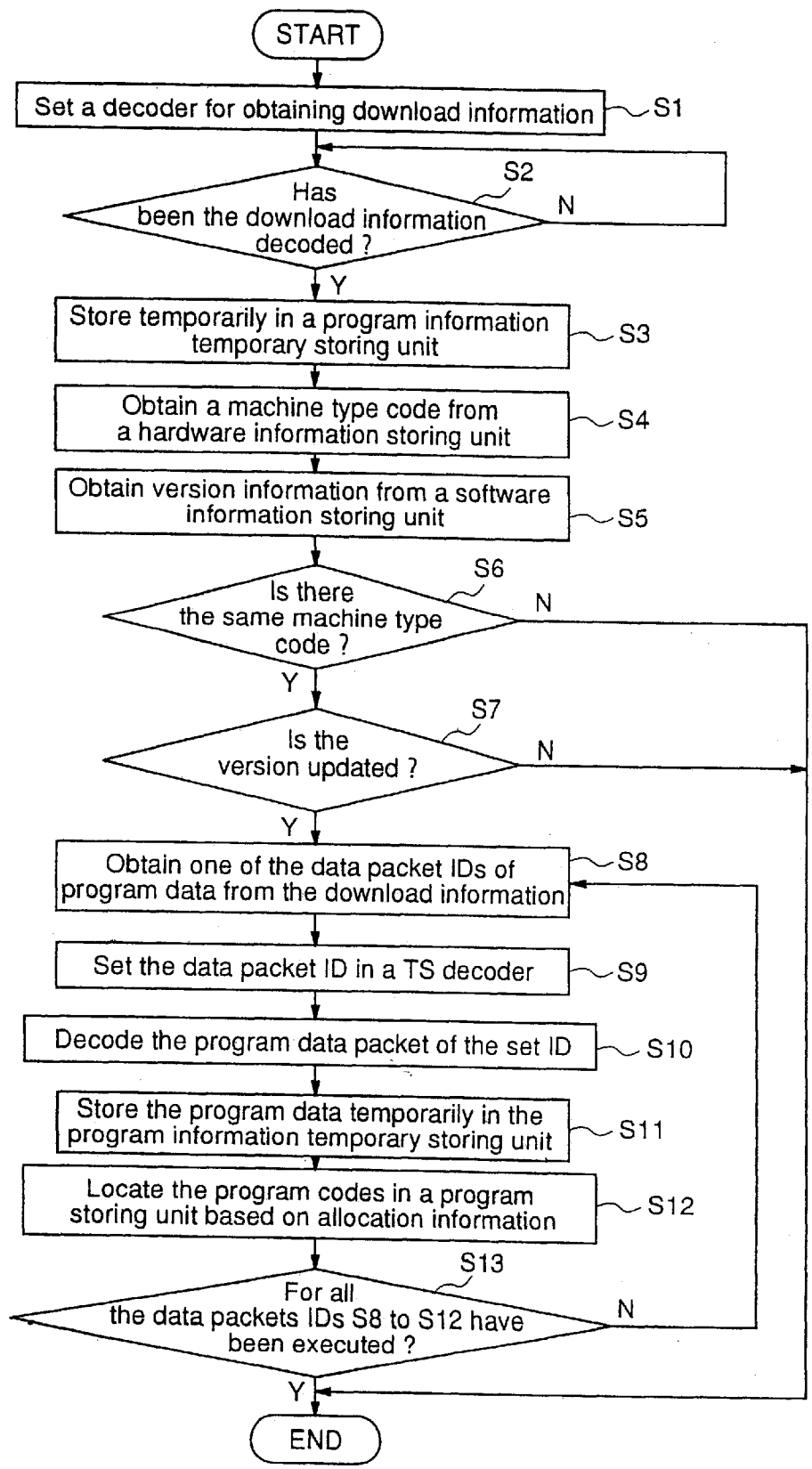
FIG. 6 is a flowchart showing an example of the operation of the remote maintenance apparatus of the first embodiment shown in FIG. 1.

FIG. 6 is a flowchart showing an example of the operation of the remote maintenance apparatus in accordance with the first embodiment shown in FIG. 1.

A description will be given of how the remote maintenance apparatus operates, referring to FIG. 6.

Initially, program information is taken up out of radio waves received from a satellite. Here, the radio waves are transport streams of the DVB (Digital Video Broadcasting) format or the MPEG format, modulated by QPSK modulation or the like. The download information is transmitted using a private section of MPEG. The download information is identified by the table ID of the private section. In the first embodiment, the table ID is explicitly presented, so a method of identifying the download information is not described here.

To take up the download information, the front-end unit 11 and the TS decoder 12 are initialized (S1), and the loader 13 inquires of the TS decoder 12 whether the download information is decoded or not (S2). Next, if the download information is decoded, the loader 13 temporarily stores the download information in the program information temporary storing unit 14 (S3). Thereafter, the loader 13 obtains a machine type code from the hardware information storing unit 16 (S4), obtains version information from the software information storing unit 17 (S5), and compares these information with the download information stored in the program temporary storing unit 14. At the time, the loader 13 examines whether the download information includes the same machine type code as that in the hardware information unit 16 or not (S6). If the download information does not include the same machine type code, the operation ends. If the download information includes the same machine code, the loader 13 examines whether the version of the program in the download information is updated more than that of the current software in the receiving apparatus (S7). If the version of the program is not updated, the operation ends. If the version of the program is updated, one of the data packet IDs of the program data corresponding to the machine type code, stored in the download information, is obtained from the download information (S8). The data packet ID is set in the TS decoder 12 (S9). The loader 13 inquires of the TS decoder whether a data packet of the program data having the data packet ID is decoded or not, and verifies that the data packet is decoded (S10).

When a data packet of the program data inquired is decoded, the loader 13 temporarily stores a data packet of the decoded program data in the program information temporary storing unit 14 (S11). Thereafter, the loader 13, based on the program allocation information described in the header portion 31 (see FIG. 3) of the program data, locates the program codes of the program data into the program storing unit 18, and determines the entry addresses of the functions and variables of the program codes, while changing the addresses of the external public entry table in the program storing unit 18 corresponding to the external public entry list of the program allocation information (S12).

As described above, S8 to S12 are repeated as many times as the number of the programs necessary for updating the version according to the download information (S13). The operation of storing all the programs necessary for updating the version is then completed.

Figure 7:
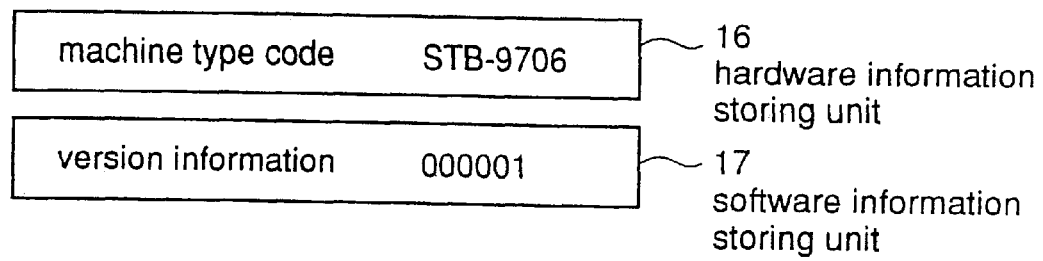
FIG. 7 is a diagram showing an example of information stored in a hardware information storing unit and a software information storing unit.

For example, when the receiver receives download information shown in FIG. 4, if hardware information and software information about the receiving apparatus shown in FIG. 7 are stored in the program storage information storing unit 15, the download information has the same machine type code as the machine type code (STB-9706) in the hardware information storing unit 16, so that the version information (000001) in the software information storing unit 17 is compared with the version information of the machine type code (STB-9706) in the download information. The machine type code (STB-9706) in the download information has two pieces of version information, that is, 000001 and 010001. The current version for the receiving apparatus is 000001, so that the version is not updated. Hence, the loader 13 obtains the data packet ID (0x0201) of the program data of the program name (MPEG driver) in the version information (010001), sets the data packet ID in the TS decoder 12, so that the data packet of the program data of the MPEG driver having the PID (0x0201) is received, and stored in the program information temporary storing unit 14. Here, when the MPEG driver has the program allocation information shown in FIG. 3, the program codes of the code portion 32 are initially stored in the program storing unit 18. At this time, if by referring to the program name it is found that the program storing unit 18 already stores a previous version of MPEG driver, the new version overwrites the previous one. If not, the new version is stored in an empty region. Since the head address of the stored MPEG driver is determined, the relative address is modified, based on the head address, to the absolute address. Finally, the entries opened to the external public are searched according to the external public entry list of the program allocation information to obtain the addresses, and overwrite the addresses of the entries of the external public entry table of the program storing unit 18. Thus, the program is completely located in the program storing unit 18.

As described above, in the remote maintenance method of the first embodiment, the broadcasting station transmits download information including machine type codes, version information, program names being the names of the programs to replace with or be added to for the version of software, and program data PIDs, and data packets of program data including program codes, program names, and the PID. A remote maintenance apparatus receives the download information, and compares the machine type code and version information of the apparatus with the download information. When the version is not updated, the program data having the program data PID, necessary for updating the version, is obtained. Thereby, it is possible to update the version of software while securing the matching of hardware and software of a receiving apparatus executing a received program.

Further, the program data further includes allocation information about where the functions included in the program are located at the receiver, and the receiver replaces the transmitted program with or adds the same to its software, thereby making the software program work certainly by updating the version.

Although the remote maintenance apparatus in the remote maintenance method in accordance with the first embodiment is regarded as a satellite broadcasting receiving apparatus receiving the download information transmitted via radio waves of a satellite, such as STB, the remote maintenance apparatus may be an apparatus for receiving the download information transmitted via radio waves of terrestrial broadcasting and radio waves except for broadcasting, or an apparatus of digital CATV for receiving the download information transmitted via wired broadcasting.

[Embodiment 2]

In the remote maintenance method in accordance with the first version, the transmitter transmits the download information including machine type codes, version information, program names, and program data PID, and the program data including program names, program allocation information, and program codes, and a receiving apparatus receives the download information, and compares the machine type code and version information of the apparatus with the download information. When the version is not updated, the receiving apparatus obtains the program data which match the receiving apparatus. In a remote maintenance method in accordance with a second embodiment, the transmitter transmits only download information. When it is confirmed, in a way similar to the first embodiment, that the version of software is not updated, the receiving apparatus informs the transmitter that the version of software is not updated.

Therefore, in the remote maintenance method in accordance with the second embodiment, the download information (see FIG. 4) that is used in the first embodiment is employed in the second embodiment.

Here, in the first embodiment, program data corresponding to all machine type codes described in the download information are transmitted. Therefore, the amount of the program data becomes huge, which reduces efficiency if the transmission is frequent. Therefore, only the download information is frequently transmitted at regular intervals. As to the program data, all the program data described in the download information are regularly transmitted, for example, restrictedly one time a day, or only the program data necessary for updating the version of software of each receiving apparatus are separately transmitted.

Figure 8:
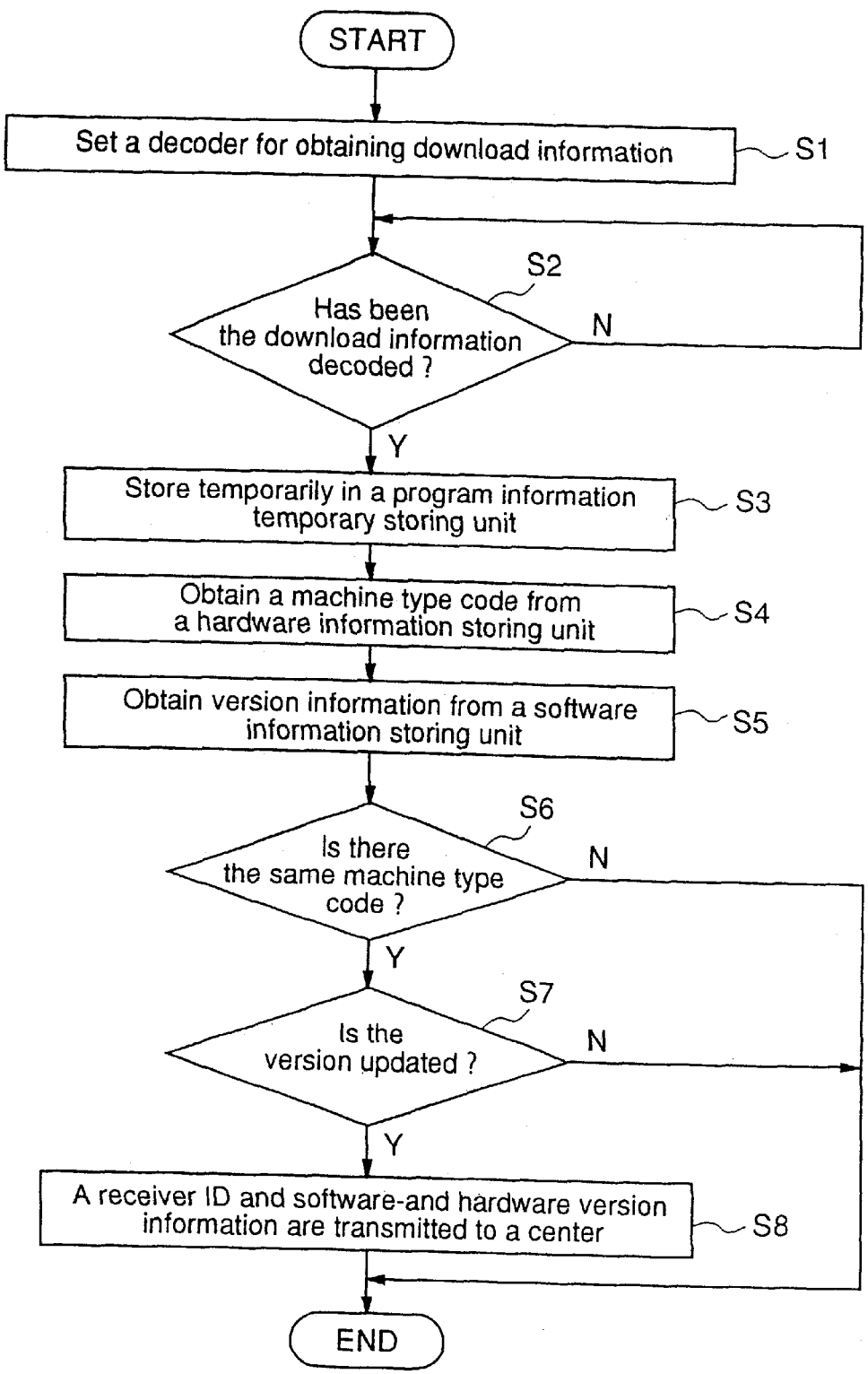
FIG. 8 is a flowchart showing an example of the operation of a remote maintenance apparatus in accordance with a second embodiment, shown in FIG. 1.

FIG. 8 is a flowchart showing an example of the operation of the remote maintenance apparatus according to the second embodiment shown in FIG. 1.

A description will be given of the operation of the remote maintenance apparatus with reference to FIG. 8.

S1 to S7 are performed in a way similar to S1 to S7 shown in FIG. 6, as in the first embodiment.

Thereafter, if the version is not updated in the download information, the operation ends. If the version is updated in the download information, the communications unit 20 informs the center 25, which is a broadcasting station for satellite broadcasting in the second embodiment, of a receiving apparatus ID for identifying the remote maintenance apparatus 1, and version information of software and version information of hardware, that is, a machine type code (S8). At this time, instead of informing of the version information of software and the machine type code, the program data PID of the program data which is decided to be necessary for updating the version in the receiving apparatus may be informed.

Thereafter, the center 25, which is a broadcasting station, transmits program data, necessary for updating the version of software in the receiving apparatus having a receiving apparatus ID, via radio waves after having been informed from the remote maintenance apparatus 1. In this case, if a broadcasting station receives demands for transmitting various program codes, from many remote maintenance apparatus having various specifications, the broadcasting station may transmit all the program data described in the download information. In a similar way, program information is transmitted via radio waves of terrestrial broadcasting, radio waves except for broadcasting, or wired broadcasting.

Further, in response to information from each personal computer, only program data needed can be transmitted via telephone lines from the center 25 to each personal computer connected to the center via a network.

Note that also when the receiver updates the version of software by receiving program codes transmitted from the transmitter, if the receiver informs the transmitter that the version is updated, the transmitter certainly knows the state of the receiver.

As hereinbefore pointed out, in the remote maintenance method in accordance with the second embodiment, the transmitter transmits only the download information used in the first embodiment. A remote maintenance apparatus receives the download information. The apparatus includes a communications unit by which when the receiver verifies that the version of software in the apparatus is not updated based on the download information, the receiver informs the transmitter that the version is not updated, and when the version is updated, the receiver also informs of the transmitter. As a result, the transmitter identifies a remote maintenance apparatus in which the version of software is not updated. Therefore, the transmitter can transmit program data to the apparatus so that the version of software is updated at the receiver, and can know that the download is certainly accomplished.

After program data have been transmitted, the receiver examines whether there is any error or not in CRC (Cyclic Redundancy Check) which detects a transmission error, and whether the error such that the addresses of a program cannot be solved occurs or not, when the program codes are not normally downloaded. The receiver can transmit to the transmitter a result of the estimation. Therefore, when the transmitter is informed of an error, the transmitter can instruct the receiver how to handle the error, while when there is no error, the transmitter can know that the program codes have been certainly downloaded.

Further, after the program has been relocated and stored, a test program (see FIG. 4), which is included in the download information and downloaded, is executed so that it is checked whether the program codes relocated and stored are logically executable or not. In this case, a result of the check can be sent to the transmitter. Therefore, when there is an error in the execution, the transmitter can instruct the receiver to handle the error appropriately. When there is no error, the transmitter can know that the completion of updating the version makes the program executable.

[Embodiment 3]

In a remote maintenance method in accordance with a third embodiment, a broadcasting station transmits service program information in addition to download information and program data in the remote maintenance method in accordance with the first embodiment.

FIG. 9 is a diagram showing an example of service program information transmitted from a broadcasting station in the remote maintenance method in accordance with the third embodiment. As shown in the figure, in the remote maintenance method in accordance with the third embodiment, a broadcasting station for satellite broadcasting transmits service program information including all-service information listing all services provided by the broadcasting station, and information about services applicable for each version of software corresponding to a machine type code besides information about services applicable depending on receiver hardware (machine type code) executing received programs. The service program information is multiplexed in broadcast programs.

Figure 10:
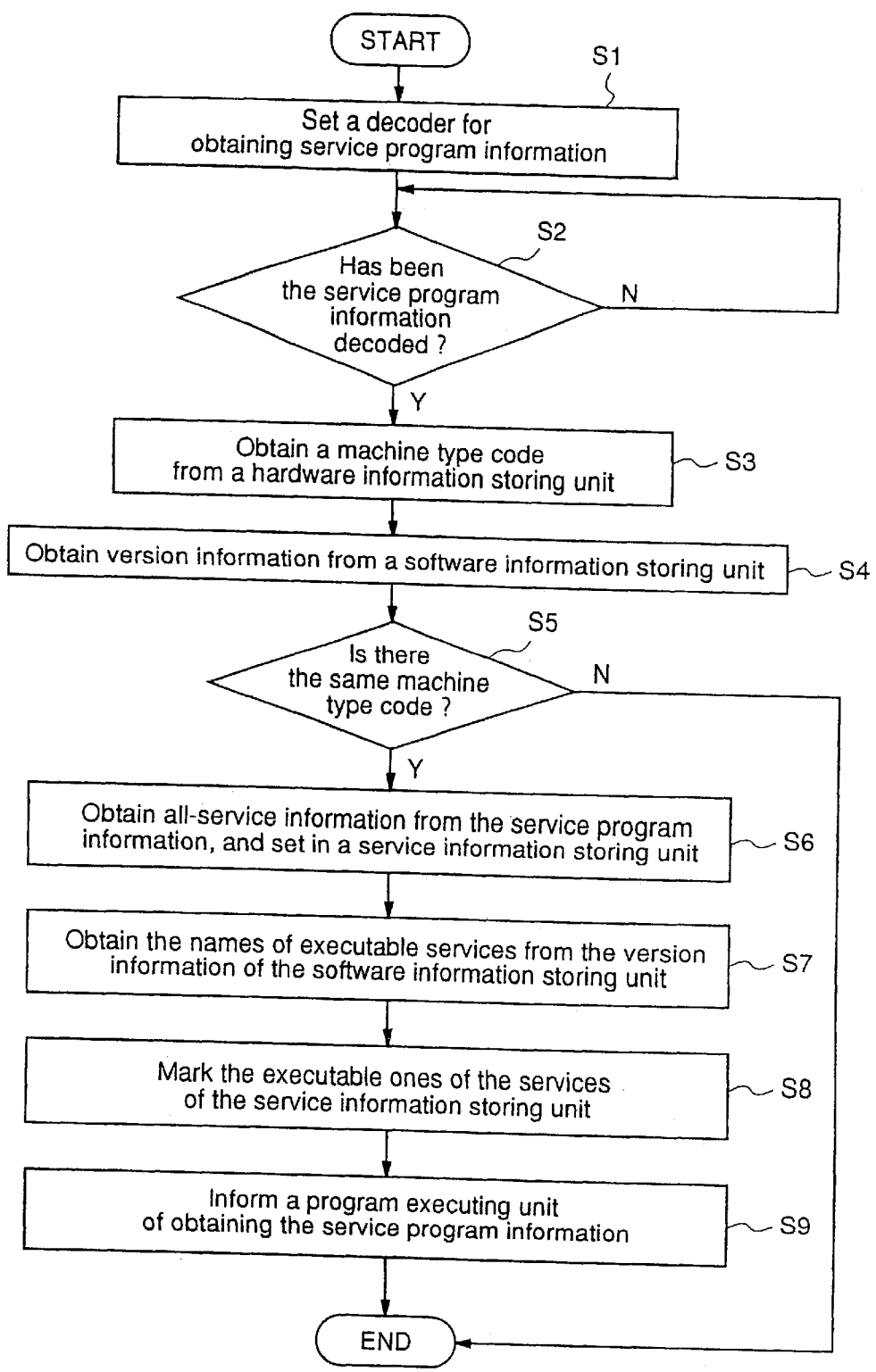
FIG. 10 is a flowchart showing an example of the operation of the remote maintenance apparatus of the third embodiment, shown in FIG. 1.

FIG. 10 is a flowchart showing an example of the operation of the remote maintenance apparatus in accordance with the third embodiment shown in FIG. 1.

The operation will be explained, referring to FIG. 10.

Initially, similar to the first embodiment, programs are stored in a version up region of the program storing unit 18. Thereafter, to take up the service program information, the front-end unit 1 and the TS decoder 12 are initialized (S1). Next, the service program information is transmitted via radio waves from a satellite to the apparatus. The loader 13 inquires of the TS decoder 12 whether the service program information is decoded or not (S2). When the service program information is decoded, at first the loader 13 obtains a machine type code from the hardware information storing unit 16 (S3), and version information from the software information storing unit 17 (S4). Thereafter, the loader 13 examines whether or not the service program information includes the same machine type code as that in the hardware information storing unit 16 (S5). When there is not the same machine type code, the operation ends without storing the service program information in the service information storing unit 21. As opposed to this, when there is the same machine type code, all-service information (see FIG. 5) is obtained from the service program information, and stored in the service information storing unit 21 (S6). The loader 13 also obtains the names of executable services according to the obtained version information in the software information storing unit 17 (S7), and marks the services executable with the current version of software, among all the services stored in the service information storing unit 21 (see FIG. 11) (S8). Thereafter, the loader 13 informs the program executing unit 19 that the loader 13 has obtained service program information (S9). Here, obtaining service program information is to store not service program information transmitted from the transmitter as it is, but information about executable services marked on all-service information shown in FIG. 11, excluding information about services executable with other receivers. Further, when the version of the receiving apparatus is not updated, if services executable when the version of the receiving apparatus is updated are also marked in a way that indicates that marked services are executable when the version is updated, the users can know the situation of the receiving apparatus better.

Figure 12:
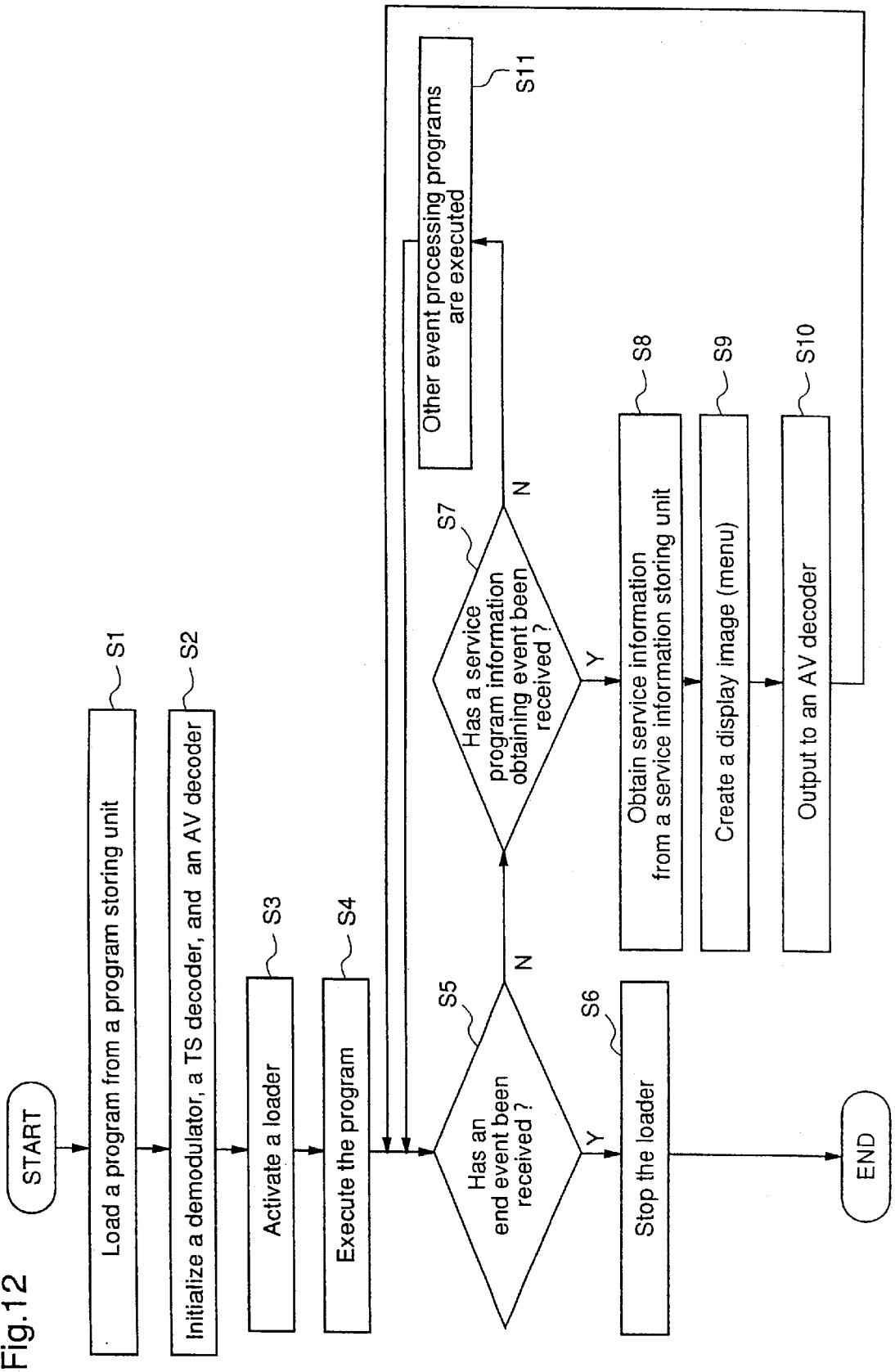
FIG. 12 is a flowchart showing an example of the operation of a program executing unit shown in FIG. 1.

FIG. 12 is a flowchart showing an example of the operation of the program executing unit 19 shown in FIG. 1.

The operation will be described, referring to FIG. 12. A program is loaded from the program storing unit 18 to the program executing unit 19 (S1). The demodulator 11, the TS decoder 12, and the AV decoder 23 are initialized (S2). The loader 13 is activated (S3). Thus, the remote maintenance apparatus is ready to take the download information, the program data, and the service program information at any time. The operation of the loader 13 when taking the download information and the program data is shown in FIG. 6, and has been already described in the first embodiment. The operation of the loader 13 when taking the service program information is shown in FIG. 10, and has been already described above. Therefore, explanations for those operations are omitted.

Thereafter, the program loaded from the program storing unit 18 is executed (S4). Here, it is examined whether or not the program executing unit 19 takes an end event from the input unit 22, for example, whether the user strokes the end key to input an end event to the input unit 22 (S5). When taking the end event, the loader 13 ends (S6).

When there is no end event, but, for instance, the program executing unit 19 takes an event of obtaining service program information, for example, that the user inputs a key for an instruction of taking service program information by a remote control gadget (S7), the program executing unit 19 obtains service information from the service information storing unit 21 (S8), produces a display image showing the service program information on a screen (S9), and outputs the image to the AV decoder 23 (S10). On the other hand, when the program executing unit 19 obtains an event other than the event of obtaining service program information, the program executing unit 19 executes a program for processing the other event obtained (S11). Afterwards, the state goes back to S5 to take a next event. When the program executing unit 19 obtains the event of obtaining service program (S7 to S10), the state also returns to S5 to process events.

Note that in step 9 an audio image may be produced to present the contents of the display image with voice instead of producing the display image.

By the display image produced in step 9, presented on a screen (see FIG. 13(a)), the user can know, at a glance, that services able to select are executable while services unable to select are not executable. The display at this time does not include "detailed information" or "cancel" shown in FIG. 13(a), but the other parts are the same shown in FIG. 13(a).

Referring to FIG. 1, a simple description is given of a case where the service program information is presented on a screen so that what services are executable is verified before one of executable services is received and executed.

The front-end unit 11 selects a channel. The TS decoder 12 outputs a menu of services, i.e., programs provided by the channel. The program executing unit 19 produces a display image for showing the obtained menu on a screen. The display image is output by the AV decoder 23, and displayed on a screen by the presentation unit 24. The user selects a desired service, for example, by using a mouse. The event is input from the input unit 22 to the program executing unit 19. The program executing unit 19 makes the TS decoder 12 decode the selected service. The service is decoded by the AV decoder 23, and displayed on a screen by the presentation unit 24. In other ways, the menus of the service program information and the services are displayed on a screen while they are linked.

As hereinbefore described, in the remote maintenance method in accordance with the third embodiment, the transmitter transmits service program information including all-service information, and information about services executable with each version of software corresponding to a machine type code, in addition to the download information and the program data used in the first embodiment. The remote maintenance apparatus receives the service program information, and compares the service program information with the machine type code and version information of the apparatus to know what services are executable in the apparatus. Thereby, the viewer can know what services are executable with the current version of software, or what services will be executable if the version is updated.

[Embodiment 4]

In a remote maintenance method in accordance with a fourth embodiment, service program information, which is used in the remote maintenance method in the third embodiment, further includes a service execution restricting item showing on what level of hardware/software performance a service can be displayed.

FIG. 14 is a diagram showing an example of service program information transmitted from a broadcasting station in the remote maintenance method in accordance with the fourth embodiment. As shown in the figure, the service program information used in the fourth embodiment includes all-service information of service program information used in the third embodiment, on which services, i.e., offered programs, are listed. This all-service information in the fourth embodiment further includes a service execution restricting item showing a level of hardware/software performance demanded by each service. A service execution restricting item is also added for each version information, showing a level of hardware/software performance on which each service is executable with each version of software corresponding to a machine type code.

For example, a service, "GAME", demands for the highest level of hardware/software performance which is a full color display. "GAME" is carried out by the receiver having a machine type code, STB-9706, and software having a version, 000001, shown in version information. However, only 16 colors are displayed. A version, 010001, of software improves a level of hardware/software performance up to 256 color display, but cannot display full color demanded for. It is full color that makes "GAME" enjoyable. The above-mentioned receiving apparatus can execute "GAME", but makes "GAME" less enjoyable because of poor display ability.

On the other hand, a service, "NEWS", demands for a level of hardware/software performance for voice on which bilingual and stereo can be presented. "NEWS" can be also carried out by a receiving apparatus having a machine type code, STB-9706. Software having a version, 000001, in version information can provide stereo, but not bilingual. Software having a version, 010001, which is updated, can provide bilingual and stereo, which is the same level of hardware/software performance demanded by the service.

A structure of the remote maintenance apparatus in accordance with the fourth embodiment is the same as that of the remote maintenance apparatus in accordance with the third embodiment. The operation of the apparatus will be explained, referring to FIG. 10.

Figure 13:
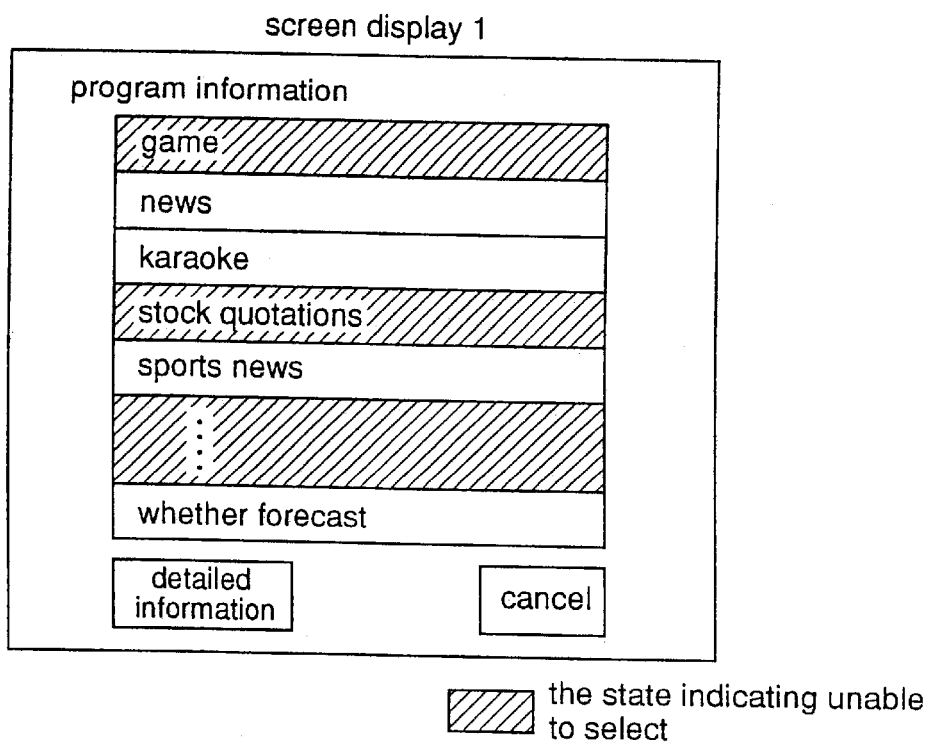
Figure 13:
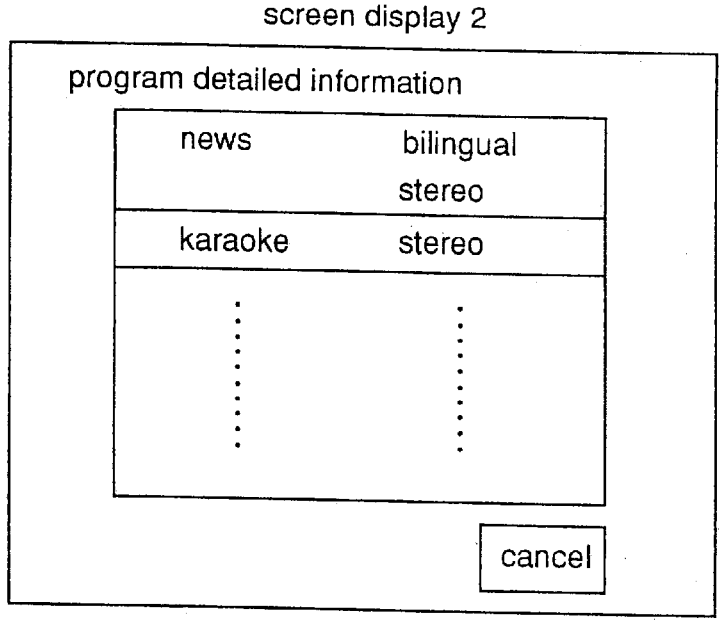

Similar to the third embodiment, S1 to S4 are carried out. If service program information does not include the same machine type code as the apparatus, the operation ends without storing the service program information in the service information storing unit 21. As opposed to this, if there is the same machine type code, the loader 13 obtains all service information and information about services related to version information, from the service program information according to version information stored in the software information storing unit 17, and stores the same in the service information storing unit 21. Thereafter, the loader 13 informs the program executing unit 19 that the loader 13 obtains service program information. Here, service program information does not include unnecessary information about services executable with other receiving apparatus. The program executing unit 19 produces display images for presenting the service program information on a screen. FIGS. 13(*a*) and 13(*b*) show the display images. At first, a display image 1 shown in FIG. 13(*a*) is presented, which is equivalent to the display image showing service program information in the third embodiment. By this display image 1, executable services are verified. Next, by clicking detailed information presented by the display image 1, a display image 2 shown in FIG. 13(*b*) is displayed. In the display image 2, executable services, and levels of hardware/software performance, on which the services can be executed with software having a current version, are presented. Because "GAME" cannot be executed, "GAME" is not displayed. Executable "NEWS" is presented. Further, bilingual and stereo, which are on a level of hardware/software performance executable with a current version, 010001, of software, is displayed.

Note that similar to the third embodiment, when the version of software is not updated, if information about services executable when the version of software is updated, as well as information about services suitable for current version information, are obtained, the users can know the situation better.

As described above, in a remote maintenance method in accordance with the fourth embodiment, the transmitter transmits service program information including the service program information used in the third embodiment and, further, a service execution restricting item showing levels of hardware/software performance for services. A remote maintenance apparatus receives the service program information, and compares the service program information with the machine type code and version information of the apparatus. The apparatus stores, out of the service program information, the all-service information, and information about services executable with the current version of software or, when the current version of software is not updated, executable when the current version of software is updated. Thereby, the viewer can know what services are executable with the current version of software, or what services will be executable if the version is updated. Besides, the viewer can know on what levels of hardware/software performance the executable services are executed.

What is claimed is:

1. A remote maintenance method in which the transmitter transmits a program which is a collection of functions performing the respective tasks, via wired or wireless digital broadcasting, and a receiver updates the version of software comprising a group of the programs by changing the programs or adding other programs to the programs, the transmitter transmitting, by data packet, download information including machine type codes indicating the version of hardware able to receive the program data, version information indicating the version of software corresponding to the machine type code, program names being the names of the programs to replace with or be added to for the version of software, and the identifiers of program data packets (PID) including program codes necessary for updating the version of software corresponding to the machine type code, and program data including the program codes of the program, the program name, and the identifier of the packet (PID), and the receiver comparing a machine type code indicating the version of the receiver hardware, and version information indicating the version of software corresponding to the machine type code, with the machine type codes and version information described in the received download information, and, when the versions of software do not match each other and thus the version of software is not updated, updating the version by receiving and storing the data packet including program data necessary for updating the version, based on the PID described in the download information.

2. The remote maintenance method of claim 1 wherein the program data further includes allocation information about where functions included in the program are to be located at the receiver, and, the receiver replaces transmitted programs with, or adds the transmitted programs to, the programs stored at the receiver, based on the allocation information.

3. The remote maintenance method of claim 1 wherein in updating the version, the receiver checks whether a transmission error occurs or not, and informs the transmitter of a result of the check.

4. The remote maintenance method of claim 1 wherein the transmitter transmits program data including the program codes of test programs, and the receiver, in updating the version, executes the test program, and informs the transmitter whether an execution error occurs or not.

5. A remote maintenance method in which a transmitter transmits a program which is a collection of functions performing the respective tasks, via wired or wireless digital broadcasting, and a receiver updates the version of software comprising a group of the programs by changing the programs or adding other programs to the programs, the transmitter transmitting, by data packet, download information including machine type codes indicating the version of hardware able to receive program data, version information indicating the version of software corresponding to the machine type code, program names being the names of the programs to replace with or be added to for the version of software, and the identifiers of program data packets (PID) including program codes necessary for updating the version of software corresponding to the machine type code, and the receiver comparing a machine type code indicating the version of the receiver hardware and version information indicating the version of software corresponding to the machine type code, with the machine type codes and version information described in the received download information, checking whether the version of software is updated or not, and informing the transmitter of a result of the check.

6. A remote maintenance method in which a transmitter transmits a program which is a collection of functions performing the respective tasks, via wired or wireless digital broadcasting, and a receiver updates the version of software comprising a group of the programs by changing the programs or adding other programs to the programs, the transmitter transmitting service program information including all-service information indicating all the names of services provided by the transmitter, machine type codes indicating the version of hardware able to receive the program data, version information indicating the version of software corresponding to the machine type code, and the names of services executable with each version of software, and the receiver comparing a machine type code indicating the version of the receiver hardware and version information indicating the version of software corresponding to the machine type code, with machine type codes and version information of the service program information, and marking the services in the all-service information, executable with the current version of software, or, when the compared versions do not match each other and thus the version of software is not updated, executable if the version of software is updated.

7. A remote maintenance method in which a transmitter transmits a program which is a collection of functions performing the respective tasks, via wired or wireless digital broadcasting, and a receiver updates the version of software comprising a group of the programs by changing the programs or adding other programs to the programs, the transmitter transmitting service program information including all-service information indicating all the names of services provided by the transmitter and service execution restricting items indicating the level of hardware/software performance demanded by each service, machine type codes indicating the version of hardware able to receive the program data, version information indicating the version of software corresponding to the machine type code, the names of services executable with each version of software, and service execution restricting items indicating the levels of hardware/software performance for the services executable with each version of software, and the receiver comparing a machine type code indicating the version of the receiver hardware and version information indicating the version of software corresponding to the machine type code, with machine type codes and version information of the service program information, and storing, among the service program information, the all-service information and information about the services executable with the current version of software, or, when the compared versions do not match each other and thus the version of software is not updated, executable if the version of software is updated.

8. A remote maintenance apparatus executing a remote maintenance method in which a transmitter transmits a program which is a collection of functions performing the respective tasks, via wired or wireless digital broadcasting, and a receiver updates the version of software comprising a group of the programs by changing the programs or adding other programs to the programs, the apparatus comprising:

a program receiving unit for receiving download information, transmitted from the transmitter, including machine type codes indicating the version of hardware able to receive the program, version information indicating the version of software corresponding to the machine type code, program names being the names of the programs to replace with or be added to for the version of software, and the identifiers of program data packets (PID) including program codes necessary for updating the version of software corresponding to the machine type code, and program data including the program codes of the program, the program name, and the identifier of the packet;

a hardware information storing unit for storing a machine type code indicating the version of the apparatus hardware;

a software information storing unit for storing version information indicating the current version of software in the apparatus;

a loader for comparing the machine type code stored in the hardware information storing unit and the version information stored in the software information storing unit, with the machine type codes and version information of the download information to check whether the version of software is updated or not, and, when the compared versions do not match each other and thus the version of software is not updated, storing the program codes of the program necessary for updating the version of software in a program storing unit described hereinafter, based on the PID described in the download information;

a program storing unit for storing the program codes necessary for updating the version of software out of the program data; and a program executing unit for executing the program stored in the program storing unit.

9. A remote maintenance apparatus executing a remote maintenance method in which a transmitter transmits a program which is a collection of functions performing the respective tasks, via wired or wireless digital broadcasting, and a receiver updates the version of software comprising a group of the programs by changing the programs or adding other programs to the programs, the apparatus comprising:

a program receiving unit for receiving download information, transmitted from the transmitter, including machine type codes indicating the version of hardware able to receive the program, version information indicating the version of software corresponding to the machine type code, program names being the names of the programs to replace with or be added to for the version of software, and the identifiers of program data packets (PID) including program codes necessary for updating the version of software corresponding to the machine type code, and program data, transmitted from the transmitter, including the program codes of the program, the program name, the identifier of the packet, and allocation information about where functions included in the program are located at the receiver;

a hardware information storing unit for storing a machine type code indicating the version of the apparatus hardware;

a software information storing unit for storing version information-indicating the current version of software in the apparatus;

a loader for comparing the machine type code stored in the hardware information storing unit and the version information stored in the software information storing unit, with the machine type codes and version information of the download information to check whether the version of software is updated or not, and, when the compared versions do not match each other and thus the version of software is not updated, storing the program codes of the program necessary for updating the version of software in a program storing unit described hereinafter, based on the PID and allocation information described in the download information;

a program storing unit for storing the program codes necessary for updating the version of software out of the program data; and a program executing unit for executing the program stored in the program storing unit.

10. The remote maintenance apparatus of claim 9 wherein in updating the version, the loader checks whether a transmission error occurs or not, and informs the transmitter, via a communications unit described hereinafter, of a result of the check, and the apparatus further comprises the communications unit for informing the transmitter of a result of the check.

11. The remote maintenance apparatus of claim 9 wherein the program receiving unit receives program data including the program codes of test programs, transmitted from the transmitter;

the loader, in controlling the storage of the program, informs the transmitter, via a communications unit described hereinafter, whether an execution error occurs or not in the execution of the test programs by the program executing unit; and the apparatus further comprises the communications unit for informing the transmitter whether an execution error occurs or not in the execution of the test programs by the program executing unit.

12. A remote maintenance apparatus executing a remote maintenance method in which a transmitter transmits a program which is a collection of functions performing the respective tasks, via wired or wireless digital broadcasting, and a receiver updates the version of software comprising a group of the programs by changing the programs or adding other programs to the programs, the apparatus comprising:

a program receiving unit for receiving download information, transmitted from the transmitter, including machine type codes indicating the version of hardware able to receive the program, version information indicating the version of software corresponding to the machine type code, program names being the names of the programs to replace with or be added to for the version of software, and the identifiers of program data packets (PID) including program codes necessary for updating the version of software corresponding to the machine type code;

a hardware information storing unit for storing a machine type code indicating the version of the apparatus hardware;

a software information storing unit for storing version information indicating the current version of software in the apparatus;

a loader for comparing the machine type code stored in the hardware information storing unit and the version information stored in the software information storing unit, with the machine type codes and version information of the download information to check whether the version of software is updated or not, and informing the transmitter of a result of the check via a communications unit described hereinafter;

a communications unit for when it is checked whether the version of software is updated or not, informing the transmitter of a result of the check along with the machine type code and version information of the apparatus;

a program storing unit for storing the program; and a program executing unit for executing the program stored in the program storing unit.

13. A remote maintenance apparatus executing a remote maintenance method in which a transmitter transmits a program which is a collection of functions performing the respective tasks, via wired or wireless digital broadcasting, and a receiver updates the version of software comprising a group of the programs by changing the programs or adding other programs to the programs, the apparatus comprising:

a program receiving unit for receiving service program information, transmitted from the transmitter, including all-service information indicating all the names of services provided by the transmitter, machine type codes indicating the version of hardware able to receive the program data, version information indicating the version of software corresponding to the machine type code, and the names of services executable with each version of software;

a hardware information storing unit for storing a machine type code indicating the version of the apparatus hardware;

a software information storing unit for storing version information indicating the current version of software in the apparatus;

a loader for comparing the machine type code indicating the version of the receiver hardware and the version information indicating the version of software corresponding to the machine type code, with the machine type codes and version information of the service program information, marking the services, executable with the current version of software or, when the compared versions do not match each other and thus the version of software is not updated, executable if the version of software in the receiver is updated, and storing the marked all-service information in a service information storing unit described hereinafter;

a service information storing unit for storing the marked all-service information;

a program storing unit for storing the program;

a program executing unit for executing the program stored in the program storing unit, and creating a display image based on the information stored in the service information storing unit; and a presentation unit for presenting the display image created by the program executing unit.

14. A remote maintenance apparatus executing a remote maintenance method in which a transmitter transmits a program which is a collection of functions performing the respective tasks, via wired or wireless digital broadcasting, and a receiver updates the version of software comprising a group of the programs by changing the programs or adding other programs to the programs, the apparatus comprising:

a program receiving unit for receiving service program information, transmitted from the transmitter, including all-service information indicating all the names of services provided by the transmitter and service execution restricting items indicating the level of hardware/software performance demanded by each service, machine type codes indicating the version of hardware able to receive the program data, version information indicating the version of software corresponding to the machine type code, the names of services executable with each version of software, and service execution restricting items indicating the levels of hardware/software performance for the services executable with each version of software;

a hardware information storing unit for storing a machine type code indicating the version of the apparatus hardware;

a software information storing unit for storing version information indicating the current version of software in the apparatus;

a loader for comparing the machine type code indicating the version of the receiver hardware and the version information indicating the version of software corresponding to the machine type code, with machine type codes and version information of the service program information, and storing, among the service program information, the all-service information and information about the services, executable with the current version of software or, when the compared versions do not match each other and thus the version of software is not updated, executable if the version of software is updated, in a service information storing unit described hereinafter;

a service information storing unit for storing the all-service information and information about the services, executable with the current version of software or, when the version of software is not updated, executable if the version of software is updated.

a program executing unit for executing the program stored in the program storing unit, and creating a display or audio image based on the information stored in the service information storing unit; and a presentation unit for presenting the display or audio image created by the program executing unit.

* * * * *